United States Patent [19]

Eiden

[11] Patent Number: 4,995,377

[45] Date of Patent: Feb. 26, 1991

[54] DUAL AXIS SOLAR COLLECTOR ASSEMBLY

[76] Inventor: Glenn E. Eiden, 302 U.S. 30 East, New Haven, Ind. 46774

[21] Appl. No.: 546,010

[22] Filed: Jun. 29, 1990

[51] Int. Cl.⁵ ............................................. F24J 2/38
[52] U.S. Cl. ........................................ 126/424; 353/3
[58] Field of Search ................ 126/424, 425; 136/246; 353/3

[56] References Cited

U.S. PATENT DOCUMENTS

| | | |
|---|---|---|
| 4,090,498 | 5/1978 | Benson . |
| 4,187,123 | 2/1980 | Diggs ................................. 126/424 |
| 4,215,410 | 7/1980 | Weslow et al. . |
| 4,402,582 | 9/1983 | Rhodes ............................. 126/424 |
| 4,476,853 | 10/1984 | Arbogast . |
| 4,572,161 | 2/1986 | Kei Mori ............................ 126/424 |

Primary Examiner—Carroll B. Dority
Attorney, Agent, or Firm—George Pappas; Richard L. Robinson

[57] ABSTRACT

A solar collector involves an elongate main boom having a longitudinal axis and a solar collector frame. Brackets are provided for pivotally mounting the solar collector frame to the main boom for pivotal motion about a first pivotal axis substantially parallel to the longitudinal axis of the main boom. A first motor is mounted to the main boom and has a rotary output shaft coaxially aligned with the first pivotal axis and drivingly connected to the frame for pivoting the frame about the first pivotal axis. A plurality of solar collector elements are pivotally mounted to the solar collector frame for synchronized pivotal motion with respect to the frame about respective second pivotal axes disposed substantially parallel to one another and substantially transverse to the longitudinal axis of the main boom. A second motor is mounted to the solar collector frame and has a rotary output shaft drivingly connected to each of the plurality of solar collector elements for pivoting each of the solar collector elements about the respective second pivotal axis.

20 Claims, 4 Drawing Sheets

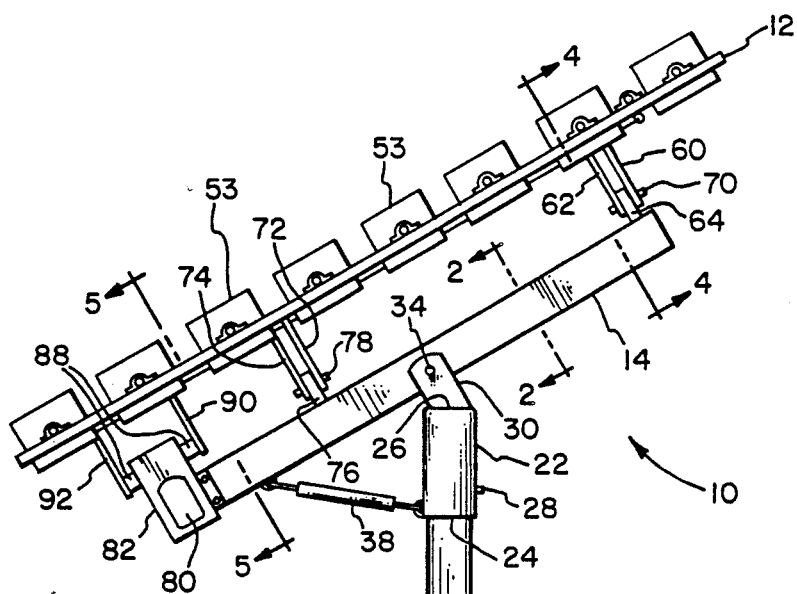
FIG. 1
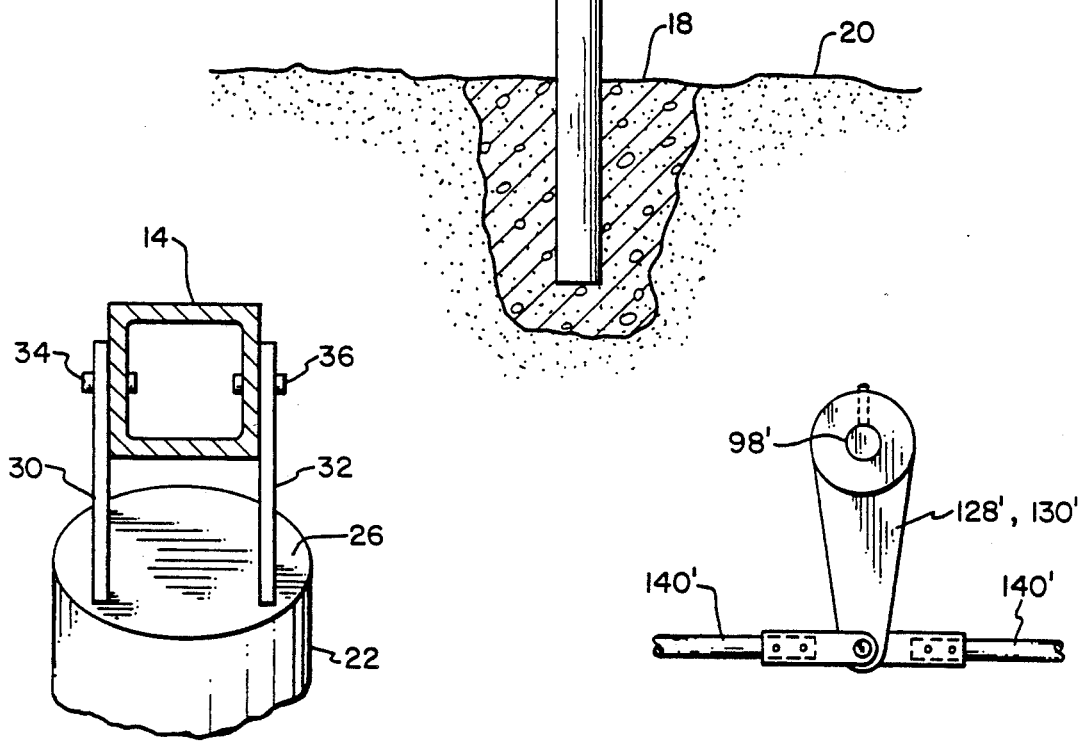
FIG. 2
FIG. 8

DUAL AXIS SOLAR COLLECTOR ASSEMBLY

BACKGROUND OF THE INVENTION

The present invention relates generally to a dual axis solar collector assembly having solar collector elements supported such that the collector elements can be maintained substantially perpendicular to the sun's rays throughout the day as the sun moves across the sky, with compensation for seasonal variations in the sun's position.

In recent times, solar collectors have become commercially available for the purpose of collecting energy from the sun and using that energy to heat water, air, or other media. Also available are solar collectors that include photo-voltaic devices that convert light energy from the sun directly into electrical energy. The collected energy is thereafter often stored in some sort of energy storage bank and used for heating air and water in homes and other buildings, for heating water, and for powering various electrical devices.

It is known that solar collectors are most efficient in collecting the sun's energy when the plane of the collector is oriented perpendicular to the sun's rays. Furthermore, it is known that the overall efficiency of solar collectors can be increased by pivoting the collectors throughout the day so that the collectors remain substantially perpendicular to the sun's rays. The mechanism for pivoting the collector must also provide for seasonal variation in the movement of the sun, preferably with such seasonal variation being compensated on a daily basis. In this fashion, efficiency is increased and the overall surface area of the solar collectors required for any particular purpose is decreased, thereby also decreasing the overall cost of the system.

Among known solar collector assemblies, there are problems in providing pivotal mountings for the solar collectors that can effectively withstand forces created by wind, snow, storms, etc. It would be advantageous to provide a solar collector assembly that alleviates the above-mentioned and other problems associated with solar collectors. Such an advantageous solar collector assembly is provided by the present invention.

SUMMARY OF THE INVENTION

A solar collector assembly, in accordance with the present invention, alleviates the problems discussed above associated with prior solar collector assemblies.

In one form thereof, a solar collector assembly includes an elongate main boom having a longitudinal axis, and a solar collector frame. A first means is provided for pivotally mounting the solar collector frame to the main boom for pivotal motion with respect to the boom about a first pivotal axis substantially parallel to the longitudinal axis of the main boom. A first motor means is mounted to the main boom and has a rotary output shaft coaxially aligned with the first pivotal axis and drivingly connected to the frame for pivoting the frame about the first pivotal axis. A plurality of solar collector elements are provided, and a second means is provided for pivotally mounting each of the plurality of solar collector elements to the solar collector frame for synchronized pivotal motion with respect to the frame about a respective one of a plurality of second pivotal axes disposed substantially parallel to one another and substantially transverse to the longitudinal axis of the main boom. A second motor means is mounted to the solar collector frame and has a rotary output shaft drivingly connected to each of the plurality of solar collector elements for pivoting each of the solar collector elements about a respective one of the plurality of second pivotal axes.

It is an object of the present invention to provide a dual axis motorized tracking system on a polar mounted structure.

It is another object of the present invention to provide an inexpensive, pivotally operable solar collector assembly that is nevertheless rigid and structurally sound, and capable of withstanding forces to which the solar panel is subjected caused by wind, snow, storms, etc.

Further objects and advantages of the present invention will be apparent from the following descriptions and drawings.

BRIEF DESCRIPTION OF THE DRAWINGS

FIG. 1 is a side elevational view of a solar collector assembly in accordance with the present invention;

FIG. 2 is a cross-sectional view of the main boom of the solar collector assembly of FIG. 1, taken through section plane 2—2 and viewed in the direction of the arrows;

FIG. 8 is a side elevational view of one of the levers and associated rods of the second embodiment of the drive means of FIG. 7.

DESCRIPTION OF THE PREFERRED EMBODIMENTS

Figure 7:
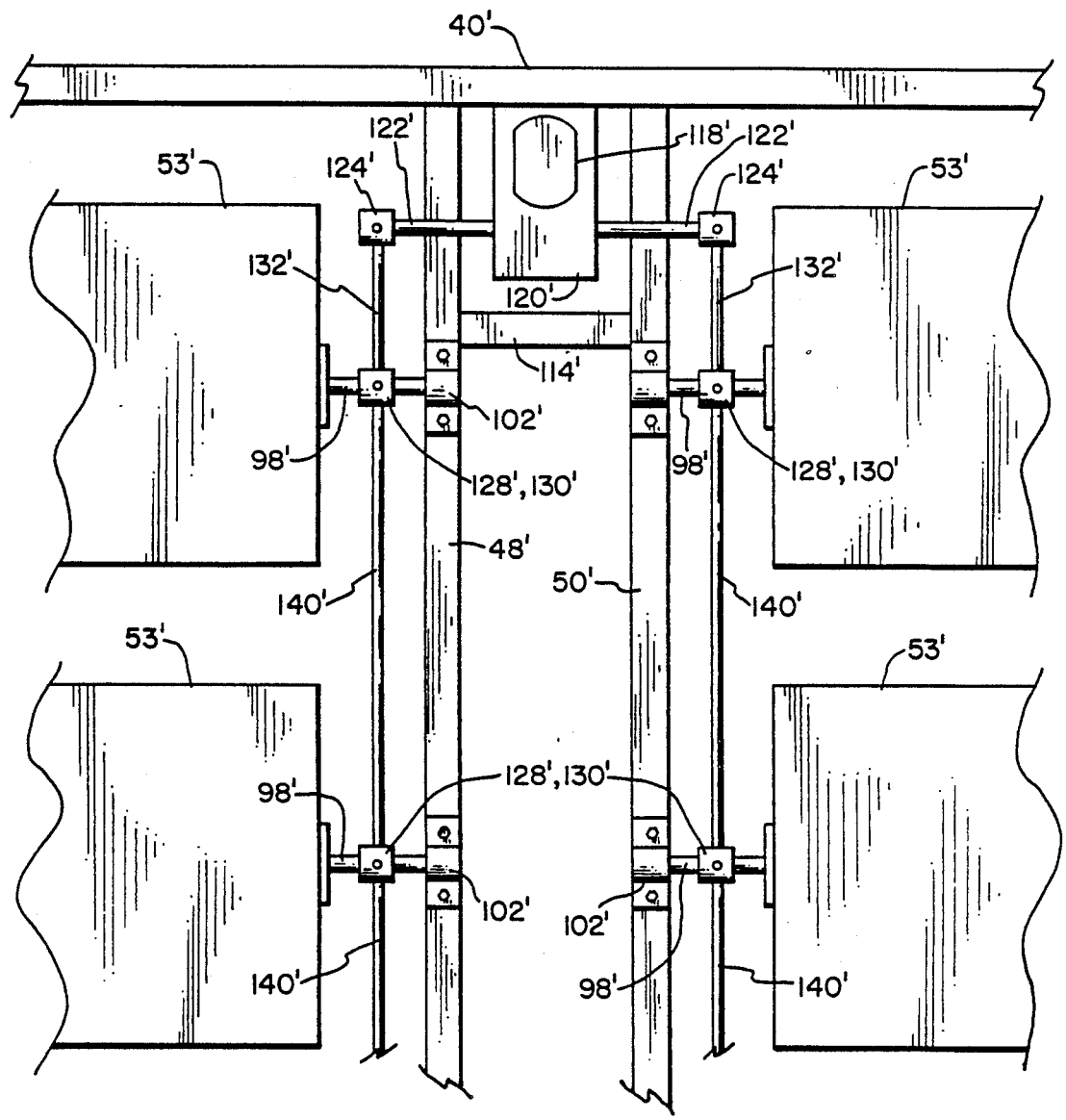
FIG. 7 is an enlarged top plan view of a portion of the solar collector frame of the solar collector assembly of FIG. 1, particularly showing a second embodiment of a drive means involving levers and rods for rotating the plurality of solar collector elements in unison.

Referring in particular to FIGS. 1 and 2, there is illustrated a solar collector assembly 10 in accordance with the present invention. Assembly 10 includes as its principle components a rectangular solar collector support frame 12 pivotally mounted to a main boom 14 that is in turn mounted to a vertically oriented support post 16. Post 16 is a round steel pipe embedded in a concrete footing 18 set in the earth 20, or otherwise rigidly supported in a vertical orientation. Disposed over the top of support post 16 is a sleeve 22 having an inside diameter that is slightly greater than the outside diameter of post 16. Sleeve 22 is open at bottom end 24 and closed at the top end thereof by end cap 26. Sleeve 22 is fixed against rotation with respect to support post 16 by set screw 28. Prior to fixing set screw 28, sleeve 22 is rotated with respect to support post 16 such that main boom 14 is aligned in a north-south orientation. Welded to end cap 26 is a pair of upright legs 30 and 32 that are parallel to one another. Legs 30 and 32 extend at an angle of about 30 degrees from vertical. Disposed within the yoke formed by legs 30 and 32 is main boom 14, which is supported therebetween by pivot pins 34 and 36. Main boom 14 is a hollow box beam of square cross section, and is maintained at a preselected angle with respect to horizontal by turnbuckle 38, the opposite ends of which engage sleeve 22 and the lower end of main boom 14, respectively. The angle of main boom 14 with respect to horizontal can be varied by turning turnbuckle 38 one way or the other so as to pivot boom 14 about pivot pins 34 and 36. Normally, the angle of main boom 14 relative to horizontal will be set only once at installation of solar collector 10, such that the acute angle between boom 14 and horizontal is equal to the latitude of the location of solar collector, i.e., a solar collector at 43° North latitude would be set up with main boom 14 at an angle of 43° with respect to horizontal. Such an orientation ensures that on a seasonal average, main boom 14 will be perpendicular to the sun's rays.

Figure 3:
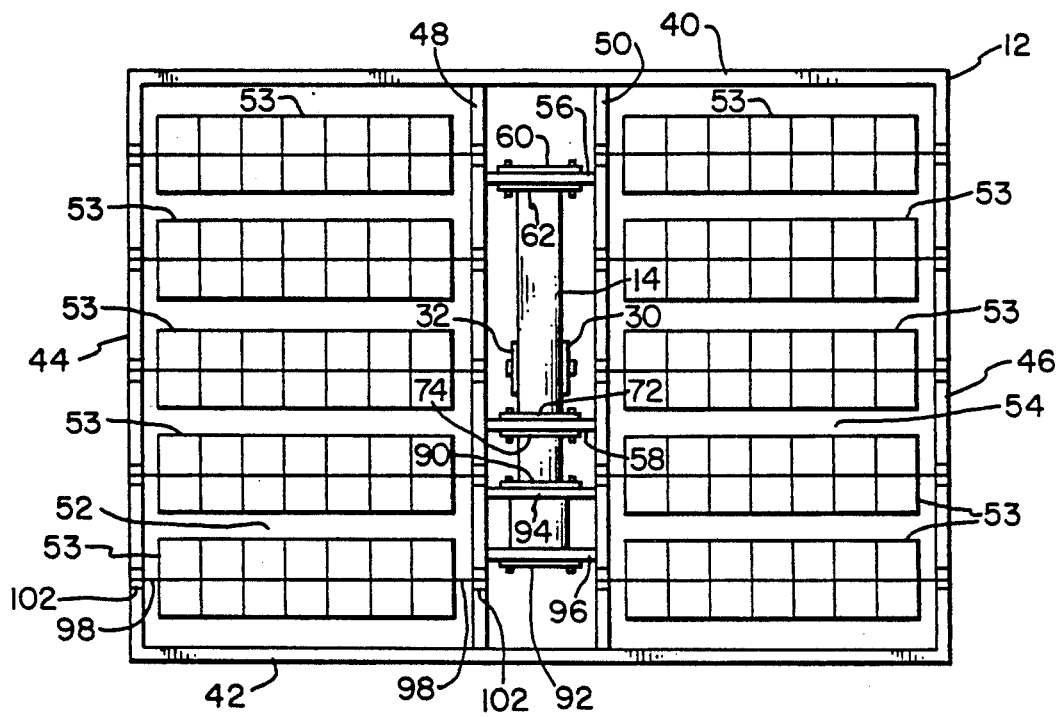
FIG. 3 is a top plan view of the solar collector frame of the solar collector assembly of FIG. 1.

Referring in particular to FIG. 3, solar collector support frame 12 is illustrated in greater detail. Frame 12 includes a plurality of frame members constructed of metal tubing having a square cross-section. In particular, frame 12 includes a first transverse frame member 40 and a second transverse frame member 42 disposed parallel to one another, with each extending the full width of solar collector support frame 12. Spanning between first and second transverse frame members 40 and 42 is a plurality of longitudinal frame members 44, 46, 48, and 50 whose opposite ends are welded to frame members 40 and 42 to form a generally rectangular planar framework. Outer longitudinal frame members 44 and 46 define the outer sides of frame 12. Inner longitudinal frame members 48 and 50 are disposed between and parallel to outer frame members 44 and 46, and are spaced apart from one another. Longitudinal frame members 44 and 48, together with transverse frame members 40 and 42, define therebetween a rectangular, open solar collector element mounting area 52, in which a plurality of solar collector elements 53 are mounted, as described further below. Likewise, longitudinal frame members 50 and 46, together with transverse frame members 40 and 42, enclose a second rectangular, open solar collector element mounting area 54, in which additional solar collector elements 53 are mounted. Mounting areas 52 and 54 are situated symmetrically on either side of main boom 14.

Figure 4:
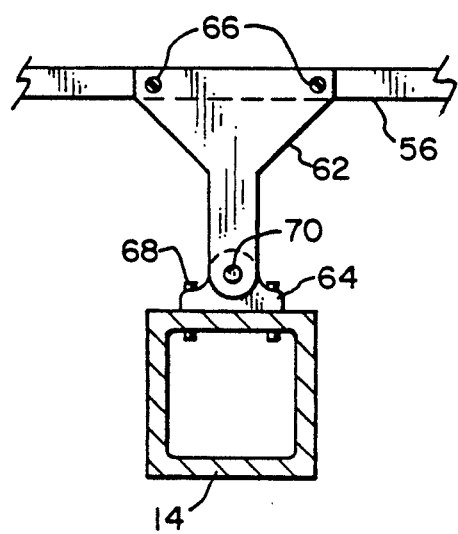
FIG. 4 is a cross-sectional view of the main boom and a portion of the solar collector frame of the solar collector assembly of FIG. 1, taken through section plane 4—4 and viewed in the direction of the arrows.

With particular reference to FIGS. 3 and 4, solar collector support frame 12 is pivotally attached to main boom 14. Spanning transversely between longitudinal frame members 48 and 50 are short transverse members 56 and 58 that are welded at their ends to longitudinal members 48 and 50 respectively. Affixed on opposite sides of short transverse member 56 are legs 60 and 62 extending downwardly therefrom generally perpendicular to the plane of support frame 12 and forming one of a first pair of brackets attached to collector frame 12, the second one of the pair of brackets being comprised of legs 72 and 74, described further below. Legs 60 and 62 are spaced from one another by the thickness of short transverse member 56, thereby forming a yoke between which is received bracket 64. Bracket 64 is one of a second pair of brackets attached to main boom 14, the second one of the second pair of brackets being bracket 76, described further below. Brackets 60 and 62 are secured to short transverse member 56 by screws 66, and bracket 64 is secured to main boom 14 by bolts 68. Brackets 60, 62 and 64 are pinned together in pivotal relationship by pivot pin 70 passing through each. Pivot pin 70 is oriented in the longitudinal direction parallel to main boom 14. A second pivot support point for frame 12 is provided by the second one of the first pair of brackets, namely legs 72 and 74, and the second one of the second pair of brackets, namely bracket 76. Legs 72 and 74 are located on opposite sides of short transverse member 58 and are attached thereto by bolts in a manner similar to that employed with legs 60 and 62 relative to short transverse frame member 56. The yoke formed by legs 72 and 74 receives therein bracket 76 that is attached to main boom 14 in a manner similar to that employed with bracket 64. Legs 72 and 74 are pivotally connected with bracket 76 by pivot pin 78 that extends through each. Pivot pin 78 is coaxially aligned with pivot pin 70 such that the first pair of brackets, namely legs 60, 62 and 72, 74, both pivot together about a common pivotal axis passing through pivot pin 70 and pivot pin 78, that axis being substantially parallel to main boom 14.

Figure 5:
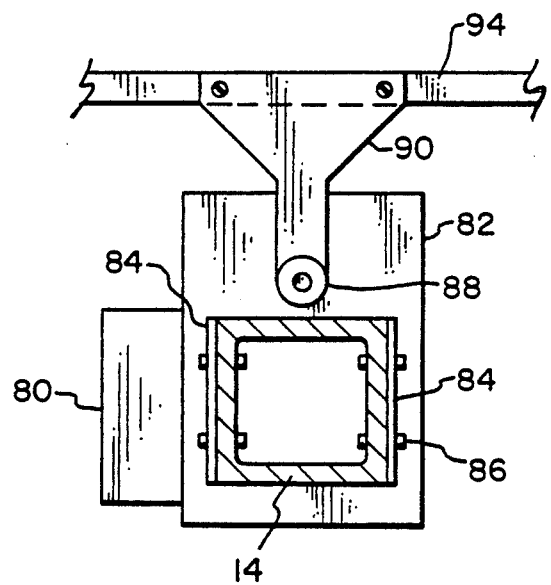
FIG. 5 is a cross-sectional view of the main boom and a portion of the solar collector frame and the drive motor assembly of the solar collector assembly of FIG. 1, taken through section plane 5—5 and viewed in the direction of the arrows.

Referring in particular to FIGS. 1, 3 and 5, solar collector assembly 10 includes an electric drive motor 80 that is connected both to main boom 14 and support frame 12 for the purpose of pivoting support frame 12 about pivot pins 70 and 78. Motor 80 is contained within a housing 82 that is securely fixed to one end of main boom 14 by U-bracket 84, attached by bolts 86. A speed reduction gear box and right angle drive located internally of housing 82 transmits the rotary output of motor 80 to output shaft 88, which extends outwardly of motor housing 82 in opposite directions. Housing 82 is so situated with respect to main boom 14 that shaft 88 is coaxially aligned with pins 70 and 78, although completely separate therefrom. Fixed to output shaft 88 at each end thereof is a pair of legs 90 and 92, each of which is affixed to a respective short transverse frame member 94 and 96. Short transverse frame members 94 and 96 are welded at their opposite ends to longitudinal frame members 48 and 50 in the same manner as transverse frame members 56 and 58, described above.

The first pair of brackets comprised of legs 60, 62 and legs 72, 74, in combination with the respective brackets 64 and 76 and pivot pins 70 and 78, constitute the main pivotable support for solar collector support frame 12 with respect to main boom 14. Motor housing 82, shaft 88, and legs 90 and 92 also provide some incidental supporting function separate and apart therefrom, but the primary function of the latter assembly is to effect pivoting of solar collector support frame 12 with respect to boom 14 about the axis defined by pivot pins 70 and 78, with which drive shaft 88 is aligned.

Figure 6:
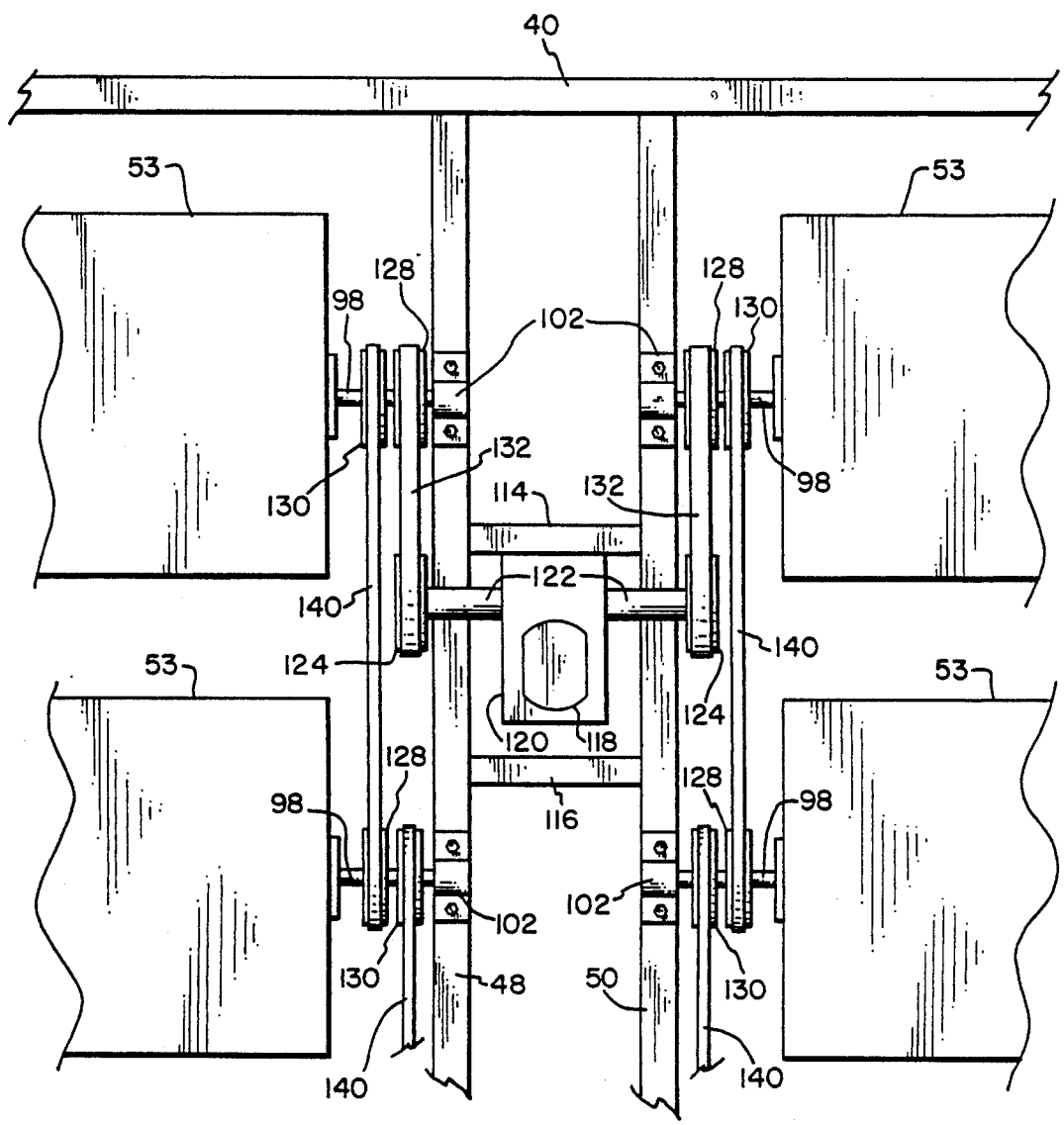
FIG. 6 is an enlarged top plan view of a portion of the solar collector frame of the solar collector assembly of FIG. 1, particularly showing a first embodiment of a drive means involving belts and pulleys for rotating the plurality of solar collector elements in unison.

Referring in particular to FIGS. 3 and 6, two banks of solar collector elements 53 are mounted in mounting areas 52 and 54 of solar collector frame 12. Each bank includes a plurality of individual collector elements that are pivotally mounted to permit rotation about respective axes oriented parallel to one another and transverse to the longitudinal frame members and to main boom 14. More particularly, each collector element 53 includes a shaft 98 extending from the inboard end thereof and from the outboard end thereof in opposite directions. Shaft 98 is received in journal bearings 102 attached to inner and outer longitudinal frame members 44 and 48, and 50 and 46.

With particular reference to FIG. 6, a first embodiment of a means for rotating the plurality of collector elements 53 in unison is illustrated. A pair of short transverse frame members 114 and 116 span between inner longitudinal frame members 48 and 50 and have their ends welded thereto. Attached between frame members 48 and 50 is electric drive motor 118 contained within motor housing 120. A rotary output shaft 122 extends from motor housing 120 in opposite directions parallel to the shafts 98 of the collector elements 53. Rotary output shaft 122 is driven by drive motor 118 via intermediate speed reduction and right angle drive gearing (not illustrated) within motor housing 120.

A pair of output pulleys 124 are connected to opposite ends of output shaft 122 and fixed thereto by set screws for rotation therewith. A pair of input pulleys 128 are similarly fixed to shafts 98. A drive belt 132 is wrapped around each set of pulleys 124 and 128, thereby transmitting rotary motion of motor output shaft 122 to shafts 98 of a first pair of collector elements 53. In order that all of the individual collector elements 53 be caused to rotate in unison, each collector element is in driven engagement with the next preceding collector element and in driving engagement with the next following collector element. This relationship is established by a driven pulley 128 fixed to shaft 98 of each collector element 53, and a drive pulley 130 fixed to shaft 98 of the next following collector element 53. Each set of driven and drive pulleys 128 and 130 is connected together in driving relationship by a transmission belt 140 that wraps around both pulleys. In this manner, angular displacement of the first collector element 53 is transmitted to each of the other collector elements 53, so that all rotate in unison to the same degree of angular displacement.

With particular reference to FIGS. 7 and 8, a second embodiment of an arrangement for rotating collector elements 53' in unison is illustrated. Elements of the second embodiment that are functionally analogous to elements of the first embodiment are designated by like primed reference numerals. A short transverse frame member 114' spans between inner longitudinal frame members 48' and 50' and has its ends welded thereto. Attached between frame members 40' and 114' is electric drive motor 118' contained within motor housing 120'. A rotary output shaft 122' extends from motor housing 120' in opposite directions parallel to the shafts 98' of the collector elements 53'. Rotary output shaft 122' is driven by drive motor 118' via intermediate speed reduction and right angle drive gearing (not illustrated) within motor housing 120'.

A pair of levers 124' are connected to opposite ends of output shaft 122' and fixed thereto by set screws for rotation therewith. Each lever 124' extends downwardly from shaft 122' substantially perpendicular thereto. One of a plurality of levers 128'/130' is attached to each shaft 98' and is fixed thereto by set screws for rotation therewith. Each lever 128'/130' extends downwardly from shafts 98' substantially perpendicular thereto. A drive rod 132' is connected to an end of lever 124' away from shaft 122', and to an end of lever 128'/130' away from shaft 98' on a first pair of collector elements 53'. Rotation of motor output shaft 122' is transmitted to lever 128'/130' via lever 124' and drive rod 132', and thus to shaft 98' of collector element 53'. In order that all of the individual collector elements 53' be caused to rotate in unison, each collector element 53' is in driven engagement with the next preceding collector element and in driving engagement with the next following collector element. This relationship is established by lever 128'/130' fixed to the shaft 98' of each collector element 53'. Each of the levers 136' are connected together in driving and driven relationship by transmission rods 140' that extend between the ends of each adjacent lever. In this manner, angular displacement of the first collector element 53' is transmitted to each of the other collector elements 53', so that all rotate in unison to the same degree of angular displacement.

It should be appreciated that levers 128'/130' can be eliminated in form, but not function, where collector elements 53' have end walls extending below shafts 98'. Such end walls are visible on collector elements 53 in FIG. 1. If such is the case, the end walls of the collector elements themselves can function as levers, if provided with a pivot pin spaced from shaft 98' to which rods 140' can be pivotally attached.

While the present invention has been particularly described in terms of preferred embodiments, it should be understood that no limitation of the scope of the invention is intended thereby, and that the scope of the invention includes variations, uses or adaptations of the invention following the general principles thereof, including such departures from the present disclosure as come within known or customary practice in the art to which this invention pertains, limited only by the claims appended hereto.

What is claimed is:

1. A solar collector comprising:
   an elongate main boom having a longitudinal axis;
   a solar collector frame;
   first mounting means for pivotally mounting said solar collector frame to said main boom for pivotal motion about a first pivotal axis substantially parallel to the longitudinal axis of said main boom; and
   first motor means, separate from said first mounting means, mounted to said main boom and having a rotary output shaft coaxially aligned with said first pivotal axis and drivingly connected to said frame, for pivoting said frame about said first pivotal axis.

2. The solar collector of claim 1, in which said first mounting means includes a first pair of spaced brackets attached to said solar collector frame, a second pair of spaced brackets attached to said main boom, a pair of pivot pins separately pivotally attaching each one of said first pair of brackets to a respective one of said second pair of brackets, each of said pair of pivot pins being coaxially aligned with said first pivotal axis.

3. The solar collector of claim 2, and further including a drive bracket attached to said solar collector frame and fixed to said rotary output shaft for translating rotary motion of said output shaft to pivotal motion of said collector frame about said first pivotal axis.

4. The solar collector of claim 1, and further including a substantially vertical support post, and pivot means for pivotally mounting said main boom to said support post for pivotal motion about an axis transverse to the longitudinal axis of said main boom.

5. The solar collector of claim 1, in which said solar collector frame is substantially rectangular and planar, and said solar collector frame is symmetrically subdivided by said first means for pivotally mounting said solar collector frame.

6. The solar collector of claim 4, and further including adjustable stop means for fixing said main boom against pivotal motion with respect to said support post at a selected orientation.

7. The solar collector of claim 1, and further including:
   a plurality of solar collector elements;
   second means for pivotally mounting each of said plurality of solar collector elements to said solar collector frame for synchronized pivotal motion with respect to said frame about a respective one of a plurality of second pivotal axes disposed substantially parallel to one another and substantially transverse to the longitudinal axis of said main boom; and
   second motor means, mounted to said solar collector frame and having a rotary output shaft drivingly connected to each of said plurality of solar collector elements, for pivoting each of said solar collector elements about a respective one of said plurality of second pivotal axes.

8. The solar collector of claim 7, in which said solar collector frame includes a pair of spaced transverse frame members disposed substantially transverse to said first pivotal axis, a pair of spaced outer longitudinal frame members disposed substantially parallel to said first pivotal axis and connected to end portions of said transverse frame members, a pair of spaced inner longitudinal frame members disposed between said outer longitudinal frame members substantially parallel thereto and connected to intermediate portions of said transverse frame members, said plurality of solar collector elements being mounted to said solar collector frame within a pair of solar collector element mounting areas, each such area being defined between adjacent inner and outer longitudinal frame members.

9. The solar collector of claim 8, in which said solar collector frame includes a pair of spaced short transverse frame members spanning between and connected to said inner longitudinal frame members, said first means for mounting being connected to each of said short transverse frame members.

10. The solar collector of claim 9, in which said first means for mounting includes a first pair of spaced brackets, each attached to a respective one of said short transverse frame members, a second pair of spaced brackets attached to said main boom, a pair of pivot means for pivotally attaching each one of said first pair of brackets to a respective one of said second pair of brackets, wherein said pair of pivot means defines said first pivotal axis therebetween.

11. The solar collector of claim 10, in which each one of said first pair of brackets includes a pair of legs attached on opposite sides of the respective short transverse frame member, said legs extending substantially perpendicular to both the transverse frame members and to the longitudinal frame members of said solar collector frame, each of said second pair of brackets being disposed between the pair of legs of the respective one of the first pair of brackets.

12. The solar collector of claim 11, in which said pair of pivot means includes a pair of pivot pins, each pivot pin pivotally connecting one of said second pair of brackets to the legs of the respective one of the first pair of brackets.

13. The solar collector of claim 1, in which said first motor means includes a housing attached to said main boom, an electric motor within said housing, gearing in driven engagement with said electric motor and in driving engagement with said rotary output shaft.

14. The solar collector of claim 4, in which said pivot means includes a pair of spaced legs upstanding from said support post and disposed on opposite sides of said main boom, and a substantially horizontally oriented pivot pin pivotally connecting said main boom to said legs.

15. The solar collector of claim 14, in which said support post is capped by a sleeve having a closed top to which said pair of spaced upstanding legs is attached, and in which said sleeve is secured against rotation relative to said support post by a set screw threadedly received through said sleeve and adjustably bearing on said support post.

16. The solar collector of claim 7, in which said second means for pivotally mounting each of said plurality of solar collector elements includes a collector element shaft attached to each collector element coaxial with one of said second pivotal axes, a drive pulley and a driven pulley affixed to each collector element shaft, and a transmission belt wrapped around the drive pulley and driven pulley of adjacent collector element shafts.

17. The solar collector of claim 16, in which the rotary output shaft of the second motor means has a drive pulley affixed thereto, and a drive belt is wrapped around the drive pulley of the second motor means and the driven pulley of one of the plurality of collector element shafts.

18. The solar collector of claim 17, and further including a substantially vertical support post, and pivot means for pivotally mounting said main boom to said support post for pivotal motion about an axis transverse to the longitudinal axis of said main boom.

19. The solar collector of claim 7, in which said second means for pivotally mounting each of said plurality of solar collector elements includes a collector element shaft attached to each collector element coaxial with one of said second pivotal axes, a lever affixed to each collector element shaft generally perpendicular thereto, and a rod connected to the levers of adjacent collector element shafts.

20. The solar collector of claim 19, in which the rotary output shaft of the second motor means has a lever affixed generally perpendicular thereto, and a drive rod is connected to the lever of the rotary output shaft and to a lever of one of collector element shafts.

* * * * *